(Model.)
H. BORSCH.
Eyeglass.
No. 235,930. Patented Dec. 28, 1880.
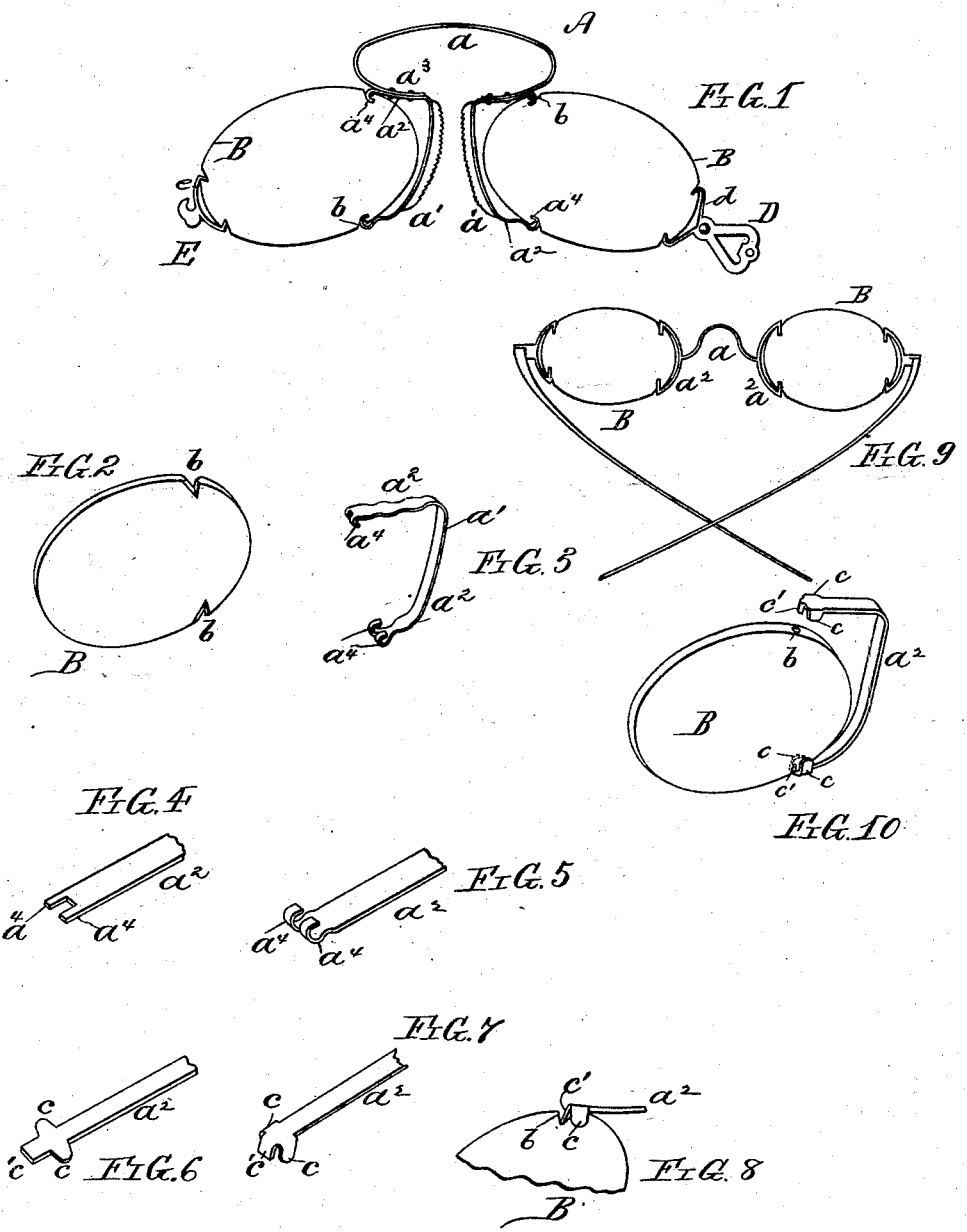
WITNESSES:
INVENTOR
Henry Borsch,
By Connolly Bros,
ATTORNEYS.

UNITED STATES PATENT OFFICE.

HENRY BORSCH, OF PHILADELPHIA, PENNSYLVANIA, ASSIGNOR OF ONE-HALF TO JOHN L. BORSCH, OF SAME PLACE.

EYEGLASS.

SPECIFICATION forming part of Letters Patent No. 235,930, dated December 28, 1880.

Application filed June 18, 1880. (Model.)

*To all whom it may concern:*

Be it known that I, HENRY BORSCH, of the city and county of Philadelphia, in the State of Pennsylvania, have invented an Improvement in Eyeglasses, of which the following is a description, reference being had to the accompanying drawings, forming a part of this specification, wherein—

Figures 1 and 9, respectively, represent eye-glasses and spectacles constructed according to my invention. Figs. 2, 3, 4, and 5 are perspective details. Figs. 6 and 7 are perspectives of a detail modification of my improvement. Fig. 8 is a broken side elevation of the same; and Fig. 10 is a perspective showing another modification of my invention.

My invention has for its object to provide means for attaching the glasses or lenses of eyeglasses to their frames or nose-pieces, such means dispensing with rims for such glasses and avoiding the necessity of holes in the latter for the reception of fastening-screws, and permitting such glasses to be readily detached from their frames by a mere pull and restored thereto by a simple insertion between the jaws of a clamp.

My improvement relates to the construction of the frames and the glasses or lenses, and to the combination of both.

Relating to the frames, it consists in forming the latter with spring-jaws which receive and hold the glasses; and, relating to the latter, it consists in forming such glasses, of the ordinary oval form, with notches or recesses for the reception of the ends of the clamping-jaws of the frames.

Referring to the accompanying drawings, which illustrate eyeglasses with my improvement applied thereto, A is the frame, consisting of bridge $a$, nose-pieces $a'\,a'$, and clamping-jaws $a^2\,a^2$. The jaws consist, as shown, of the ends of the nose-pieces, the latter being riveted to the bridge at $a^3$, and bent and cut as shown.

B B are the glasses or lenses, formed with notches or recesses $b\,b$, which receive the ends of the jaws $a^2$.

In forming the jaws the ends are first notched or bifurcated, leaving two forks, $a^4\,a^4$, and are then bent around, as shown, so that when the glasses are inserted they fit in said forks, the metal in the jaws between said forks passing down into the notches or recesses $b\,b$. This construction is shown in Figs. 1, 3, 4, 5, and 10, or a modification thereof, as shown in Figs. 6, 7, and 8, may be employed. In this modification the ends of the jaws are not bifurcated or forked, but instead thereof are formed with a cross or two lateral lugs, $c\,c$. The end $c'$ beyond said lugs is then bent over so as to enter the notches $b\,b$ in the glasses, while the lugs $c\,c$, which are bent up, as shown, embrace either side of the glass fitted to them.

Another modification of my invention is shown in Fig. 10, in which holes in the periphery are substituted for the notches, and the lugs $c'$ are made small enough to enter the holes.

The great advantages of the foregoing improvement are simplicity and cheapness of construction and the readiness with which broken glasses or lenses may be taken from the frame and new ones substituted therefor.

Heretofore when a glass was broken it was necessary to send the same to an optician for repair, imposing inconvenience and discomfort on the owner while such repair was being effected. An attempt has been made to overcome this difficulty by providing the inner end of the lenses with dovetail-shaped projections and screw-clamps embracing said projections. These eyeglasses, however, although to some extent overcoming the difficulty, are not so cheaply manufactured as mine, nor are they so convenient in repairing, for with my glasses it is only necessary to insert one of the ends of the clamp in one of the notches of the lens, and to press the latter toward the nose-piece, when the round part of the end of the lens will act like an inclined plane, and cause the other end of the clamp to ride up and fall into the other notch, thus securely fastening the lens in place. The lens can be as readily removed, as it is only necessary to slightly pull on one end of the clamp, when the lens will slip out.

I have shown the jaws and nose-pieces as being each made of a single piece of metal— i. e., one piece of metal forms one nose-piece and the two jaws for one lens or glass—and this is obviously the most economical plan of construction; but I do not limit my invention thereto, as the nose-pieces and clamping-jaws may be made of separate pieces, and then riveted or otherwise secured together. As the nose-pieces are elastic or resilient, the jaws will yield readily to permit the insertion of the glasses or lenses, and will clamp the latter securely in position when inserted.

The handle (shown at D) and catch (shown at E) may be secured to the glasses in the same manner as the frames—i. e., by forming such handle and catch with spring-clamps $d\ e$, respectively, the glasses having peripheral notches for the engagement of the same.

What I claim as my invention is—

1. The frame of an eyeglass formed with spring-clamp jaws for the reception and retention of the glasses or lenses, said jaws being constructed and adapted to clamp and hold the glasses by reason of their contractile elasticity, substantially as specified.

2. An eyeglass, B, having both ends round, and provided with recesses $b\ b$, adapted to receive the ends of a clamp sprung into them, substantially as and for the purpose specified.

3. An eyeglass-frame having the ends of the nose-pieces bent to form clamping-jaws for the glasses or lenses, constructed and adapted to clamp and hold the glasses by elastic contractibility, substantially as shown and described.

4. The combination, with glasses B B, having notches $b\ b$, of spring-jaws $a^2\ a^2$, adapted to enter said notches and embrace the glass thereabout by their elastic contractile force, substantially as shown and described.

5. Handles and catches D E, (either or both,) detachably secured to glasses B B by spring-clamps and notches, said spring-clamps having contractile elasticity, whereby they will clamp and hold the glasses without the use of binding-screws or other fastenings, substantially as shown and described.

In testimony that I claim the foregoing I have hereunto set my hand this 14th day of June, 1880.

HENRY BORSCH.

Witnesses:
M. D. CONNOLLY,
WM. M. MCKNIGHT.